(12) United States Patent
Snead

(10) Patent No.: US 12,068,084 B2
(45) Date of Patent: *Aug. 20, 2024

(54) PROCESSING ULTRA HIGH TEMPERATURE ZIRCONIUM CARBIDE MICROENCAPSULATED NUCLEAR FUEL

(71) Applicant: Ultra Safe Nuclear Corporation, Seattle, WA (US)

(72) Inventor: Lance Lewis Snead, Bellport, NY (US)

(73) Assignee: ULTRA SAFE NUCLEAR CORPORATION, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,765

(22) Filed: Apr. 28, 2023

(65) Prior Publication Data
US 2023/0326619 A1  Oct. 12, 2023

Related U.S. Application Data

(63) Continuation of application No. 17/383,560, filed on Jul. 23, 2021, now Pat. No. 11,728,047, which is a (Continued)

(51) Int. Cl.
*G21C 3/62* (2006.01)
*G21C 3/04* (2006.01)
*G21C 3/07* (2006.01)

(52) U.S. Cl.
CPC ............. *G21C 3/623* (2013.01); *G21C 3/045* (2019.01); *G21C 3/07* (2013.01)

(58) Field of Classification Search
CPC .......... G21C 3/623; G21C 3/045; G21C 3/07; G21C 3/62; G21C 21/02; G21C 3/044; G21C 3/28; G21C 3/626; Y02E 30/30
See application file for complete search history.

(56) References Cited

U.S. PATENT DOCUMENTS 9,299,464 B2   3/2016   Venneri et al.
9,620,248 B2   4/2017   Venneri
(Continued)

OTHER PUBLICATIONS

Entire patent prosecution history of U.S. Appl. No. 17/383,560, filed Jul. 23, 2021, entitled, "Processing Ultra High Temperature Zirconium Carbide Microencapsulated Nuclear Fuel."
(Continued)

*Primary Examiner* — Andrew J. Oyer
(74) *Attorney, Agent, or Firm* — Buchanan Ingersoll & Rooney PC

(57) ABSTRACT

The known fully ceramic microencapsulated fuel (FCM) entrains fission products within a primary encapsulation that is the consolidated within a secondary ultra-high-temperature-ceramic of Silicon Carbide (SiC). In this way the potential for fission product release to the environment is significantly limited. In order to extend the performance of this fuel to higher temperature and more aggressive coolant environments, such as the hot-hydrogen of proposed nuclear rockets, a zirconium carbide matrix version of the FCM fuel has been invented. In addition to the novel nature to this very high temperature fuel, the ability to form these fragile TRISO microencapsulations within fully dense ZrC represent a significant achievement.

20 Claims, 1 Drawing Sheet

Related U.S. Application Data continuation of application No. 16/699,698, filed on Dec. 1, 2019, now Pat. No. 11,189,383.

(60) Provisional application No. 62/774,303, filed on Dec. 2, 2018.

(56) References Cited

U.S. PATENT DOCUMENTS

| | | |
|---|---|---|
| 10,032,528 B2 | 7/2018 | Venneri |
| 10,109,378 B2 | 10/2018 | Snead |
| 10,229,757 B2 | 3/2019 | Filippone et al. |
| 10,475,543 B2 | 11/2019 | Venneri |
| 10,573,416 B2 | 2/2020 | Venneri |
| 2013/0077731 A1* | 3/2013 | Sherwood ............... G21C 3/62 264/0.5 |
| 2017/0025192 A1 | 1/2017 | Snead |
| 2017/0287575 A1 | 10/2017 | Venneri |
| 2017/0287577 A1 | 10/2017 | Venneri |
| 2020/0027587 A1 | 1/2020 | Venneri |

OTHER PUBLICATIONS

Entire patent prosecution history of U.S. Appl. No. 16/699,698, filed Dec. 1, 2019, entitled, "Processing Ultra High Temperature Zirconium Carbide Microencapsulated Nuclear Fuel."

* cited by examiner

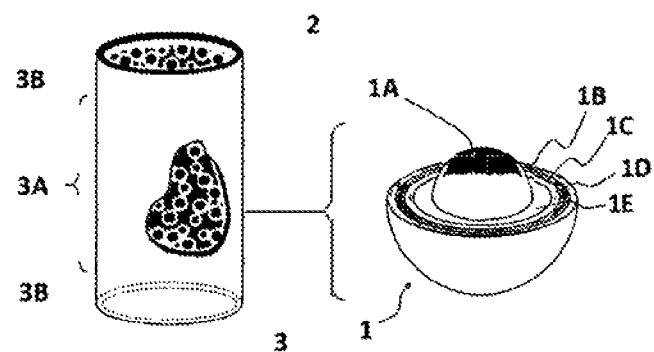

PROCESSING ULTRA HIGH TEMPERATURE ZIRCONIUM CARBIDE MICROENCAPSULATED NUCLEAR FUEL

CROSS-REFERENCE TO RELATED APPLICATIONS

This application is a continuation of U.S. patent application Ser. No. 17/383,560, filed Jul. 23, 2021, titled "Processing Ultra High Temperature Zirconium Carbide Microencapsulated Nuclear Fuel," the entire disclosure of which is incorporated by reference herein. U.S. patent application Ser. No. 17/383,560 is a continuation of U.S. patent application Ser. No. 16/699,698, filed Dec. 1, 2019, now U.S. Pat. No. 11,189,383, issued Nov. 30, 2021, titled "Processing Ultra High Temperature Zirconium Carbide Microencapsulated Nuclear Fuel," the entire disclosure of which is incorporated by reference herein.

U.S. patent application Ser. No. 16/699,698 claims priority to U.S. Provisional Patent Application No. 62/774,303, filed Dec. 2, 2018, titled "Processing Ultra High Temperature Zirconium Carbide Microencapsulated Nuclear Fuel," the entire disclosure of which is incorporated by reference herein.

The entire disclosures of U.S. Pat. No. 9,299,464 B2, titled "Fully Ceramic Nuclear Fuel and Related Methods" and U.S. Pat. Pub. No. 2017/0025192 A1, titled "Method for Fabrication of Fully Ceramic Microencapsulated Nuclear Fuel" are incorporated by reference herein.

STATEMENT REGARDING FEDERALLY SPONSORED RESEARCH OR DEVELOPMENT

Not Applicable.

BACKGROUND OF THE INVENTION

1. Field of the Invention

This invention relates to a nuclear fuel. More specifically this invention describes a new fuel form and the method for fabrication of this inert matrix fuel whereby a fragile fuel microencapsulation is consolidated within an ultra-high-temperature-ceramic (UHTC) (zirconium carbide) that serves as a secondary and very high-temperature barrier to fission product release.

2. Description of the Related Art

There are many known types of nuclear fuel for both research, power producing nuclear reactors, and reactor for space exploration. The most common example of nuclear fuel is the ceramic uranium oxide pellet that is contained within a thin metallic cladding. That cladding both provides a rigid structure to hold the fuel and serves as the barrier to fission product release to the coolant stream. A second example of nuclear fuel is an inert matrix fuel (IMF) in which a fissile material such as (or containing) U-235 is dispersed in an inert host matrix. That inert matrix may be a refractory ceramic and is intended to provide a rigid host for the fuel as well as provide a measure of fission product retention. Yet a third example is a microencapsulated fuel, in one example known as the fully ceramic microencapsulated FCM™ fuel. This fuel type, similar to that of the IMF, has a distinct non-fuel matrix surrounding a plurality of fueled particles otherwise known as microencapsulations. In contrast with the IMF the microencapsulated fuels utilize an engineered fuel microencapsulation, such as the tri-isotropic (TRISO) or bi-isotropic (BISO) fuel forms which layers pyrolitic graphite and SiC (for the TRISO) around the fissile fuel kernels thus providing barriers to fission product retention within the fuel. The historic and most common porous host matrix is graphite. Such a fuel was developed as early nuclear thermal propulsion rockets with good success. This FCM fuel has the attribute of having both a primary fission product barrier (the TRISO fuel particle) and a secondary barrier being the SiC matrix. This combination thus provides two rugged barriers to fission product release.

The SiC matrix of the known FCM™ fuel is fabricated through a Transient Eutectic-Phase (TEP) process whereby rare earth oxides are utilized to reduce the sintering temperature and pressure required to achieve full density for the SiC matrix. As taught in U.S. Pat. No. 9,299,464 B2 and 2017/0025192 A1 this process is essential in allowing a process window for which the fragile TRISO particles will not be crushed and thereby rendered ineffective in a fuel application. However, while the standard FCM product is considered robust for application temperatures up to 1850° C., above that temperature unacceptable SiC matrix degradation occurs due to instability of TEP SiC. Moreover, for application in systems such as nuclear thermal rocket engines the reaction between SiC and hot hydrogen is unacceptable. In order to move into a higher performance regime, a higher temperature ultra-high temperature ceramic (UHTC) that replaces the SiC matrix of the microencapsulated fuel is put forward. Typical UHTC's and their maximum application temperatures are provided in the table below. Of those materials listed zirconium carbide has a number of attractive features as an ultra-high temperature fuel matrix, though has historically been very difficult to process, requiring temperature and pressure well in excess of that which would crush modern TRISO fuel microencapsulation. The present invention provides a process to fabricate a zirconium carbide matrix microencapsulated fuel at conditions favorable to the use of TRISO fuel.

| Material | Formula | Crystal structure | Density (g/cm$^3$) | Melt or Decomp. Temperature (° C.) |
|---|---|---|---|---|
| Niobium nitride | NbN | Cubic | 8.470 | 2573 |
| Tantalum nitride | TaN | Cubic | 14.30 | 2700 |
| Vanadium carbide | VC | Cubic | 5.77 | 2810 |
| Silicon carbide | SiC | Cubic | 3.21 | 2820 |
| Zirconium nitride | ZrN | FCC | 7.29 | 2950 |
| Titanium nitride | TIN | FCC | 5.39 | 2950 |
| Tantalum boride | TaB2 | HCP | 12.54 | 3040 |
| Titanium carbide | TIC | Cubic | 4.94 | 3100 |
| Titanium boride | TiB$_2$ | HCP | 4.52 | 3225 |
| Zirconium boride | ZrB$_2$ | HCP | 6.10 | 3245 |
| Hafnium boride | HfB$_2$ | HCP | 11.19 | 3380 |
| Hafnium nitride | HfN | FCC | 13.9 | 3385 |
| Zirconium carbide | ZrC | FCC | 6.56 | 3400 |
| Niobium carbide | NbC | Cubic | 7.820 | 3490 |
| Tantalum carbide | TaC | Cubic | 14.50 | 3768 |
| Hafnium carbide | HfC | FCC | 12.76 | 3958 |

BRIEF SUMMARY OF THE PRESENT INVENTION

The present invention provides the concept for a zirconium-carbide-matrix, ultra-high-temperature ceramic matrix fuel designed for advanced nuclear application. As envisioned, in comparison with standard FCM fuel which would achieve a nominal specific impulse in the range of 500-600 s, the use of ZrC-based or pure ZrC matrix UHTC FCM fuel would achieve in the range of 700-850 s. Application of this fuel includes nuclear rocket engines and systems requiring fuel of limited fission product release to operate at temperatures in excess of 2500° C. Use of ZrC matrix UHTC FCM could incorporate TRISO of standard or more rugged SiC micropressure vessels for short durations in the temperature range of 2200-2400° C., 2 hr time periods. Advanced microencapsulation whereby ZrC shells replace the SiC microencapsulation of the TRISO can be considered for longer life or higher temperature application. The TRISO containing ZrC is known to the literature (i.e. TRIZO), displaying similar crush strength to standard modern TRISO.

The critical step towards achieving fabrication of the ZrC matrix UHTC FCM is the ability to consolidate a near full density matrix of ZrC while not compromising the function of the entrained second phase fissile fuel: to not crush, deform, or substantially react layers. In the case of a SiC (or ZrC) TRISO microencapsulation this means consolidation without rupture of a significant (<10 ppm) number of the SiC (or ZrC) protective shell layers. This is accomplished through suppression of the normal pressures and temperatures required for sintering of zirconium carbide. In addition to a low failure fraction of TRISO particles a measure of success for the matrix is to achieve near full density without interconnected porosity. As described, two methods have achieved acceptable levels of success in producing ZrC matrix UHTC FCM: A) Transient Eutectic-Phase Processing. B) Hydrogen Aided Sintering.

BRIEF DESCRIPTION OF THE DRAWINGS

FIG. 1 is a schematic of the (known) FCM fuel geometry. The TRISO fuel form (right-most) is embedded in a matrix of fully dense Ultra High Temperature Ceramic. Form factor is arbitrary.

REFERENCE NUMERALS IN THE DRAWINGS

1 Microencapsulated fuel
1A Fissile fuel kernel
1B Outer pyrolitic carbon layer of microencapsulated fuel
1C SiC or alternate UHTC layer of microencapsulated fuel
1D Inner pyrolitic carbon layer of microencapsulated fuel
1E Buffer graphitic layer of microencapsulated fuel
2 Ceramic fuel sleeve
3 FCM mixture to be cold pressed
3A FCM constituent mixture: Zr and C powder, microencapsulated fuel, silica, aluminum oxide, and/or neutron poison rare earth oxides.
3B FCM constituent mixture: Zr and C powder, yttrium oxide, aluminum oxide, and neutron poison rare earth oxide.

DETAILED DESCRIPTION OF THE INVENTION

FIG. 1 provides a schematic similar to the known fully ceramic microencapsulated (FCM.) Whereby the known FCM utilizes SiC powder as a major matrix constituent, FIG. 1 portrays a fuel that is comprised of the fissile-fuel containing microencapsulation, in this case depicted as a Tri-Isotropic (TRISO) particle (item 1.) The new ZrC-matrix UHTC FCM fuel is demonstrated with acceptable matrix density and encapsulation integrity, post-processing, as achieved by the following means:

Transient Eutectic-Phase Approach: Utilizing a combination of kinetic ball milling and high-shear milling to combine a certain volume fraction of ZrC powder and small percentage of SiC and oxide (such as $Al_2O_3$ and $Y_2O_3$) powders. This combination of ZrC, SiC and oxide powders form the dense matrix of this UHTC microencapsulated fuel. The compact of FIG. 1, forming the UHTC-FCM are fabricated at pressures not exceeding 20 MPa and temperatures not exceeding 2000° C. to attain a continuous, low porosity, ZrC matrix surrounding TRISO particles which remain unbroken and intimately bonded with the matrix following processing. The amount of oxide eutectic aids in the starting powder mix for processing the UHTC FCM fuel is up to 3 weight percent. The amount of SiC in the starting powder mix is up to 30 weight percent.

Specifically, the transient eutectic phase (TEP) SiC mixture is comprised using 94% SiC, 3.9% Al2O3, 2.1% Y2O3 by mass. The density was critically sensitive to both amount and ratio of rare earth additives. The SiC powder used were either 35 nm or 85 nm nanophase powder produced by chemical vapor deposition process. The TEP SiC mixture was mixed with milling media, dried, deagglomerated and re-dispersed in atmosphere prior to use. The feedstock material consists of powders sourced from commercial vendors and processed under typical methodologies found in ceramic powder forming and sintering. The TEP SiC mixture was added to ZrC in ratios of ZrC with 10 wt % TEP SiC mixture and re-mixed as previously described. The feedstock powder is mixed with a proprietary set of dispersants, binders, flow plasticizers and release agents, which assist in rheological properties needed for forming operations.

Sintering was conducted inside graphite tooling, configured for ~10 mm diameter. Green bodies are formed in-die by loading the powder mixture directly into prepared graphite tooling. A cylindrical graphite die with a cylindrical cavity was lined with graphite foil. This conducts heat into the pellet and provides a release interface for the consolidated pellet. The pellet is formed by pouring the ZrC-based powder, followed by compaction by spark plasma sintering (SPS) for 10 minutes at 20 MPa at room temperature during the vacuum cycle. Before sintering the pressure was reduced to 10 MPa. The applied pressure was limited in order to establish processing conditions compatible with TRISO particles, which fail at low pressures at room temperature. Sintering temperatures of 1875° C. for 10 minutes. After sintering, the ZrC-10% TEP SiC mixture made into solid pellets. The pellets achieved 93% theoretical density.

Hydrogen Aided Reaction Sintering: Utilizing a non-stoichiometric mixture of ZrC powder, ZrH and carbon powder the UHTC FCM ZrC matrix takes advantage of enhanced diffusion in a sub-stoichiometric ZrC and the decomposition of ZrH at approximately 900° C. In the absence of hydride decomposition the temperature and pressures were in excess of 2000° C. and 60 MPa with <95% theoretical density. With the addition of percent levels of ZrH the compact achieves near full density at temperatures under 1800° C. Powder handling and direct current sintering is carried out in a similar fashion to the Transient Eutectic-Phase Approach. Pressures not exceeding 20 MPa and temperatures in the 1650-1800° C. range produce a dense matrix and rupture-free TRISO microencapsulations. ZrH additions up to 10 weight percent by mass are demonstrated effective with free carbon in the range of 0.1 to 4% by mass.

The invention claimed is:

1. A nuclear fuel product, comprising:
fuel particles that include a fuel kernel and one or more layers encapsulated within a zirconium carbide (ZrC) matrix,
wherein the zirconium carbide matrix includes near fully dense ZrC that is sub-stoichiometric ZrC with less than 100% theoretical density.

2. The nuclear fuel product of claim 1, wherein the fuel particles include Tri Structural Isotropic fuel (TRISO) fuel particles or a variation of TRISO fuel particles utilizing zirconium carbide (TRIZO).

3. The nuclear fuel product of claim 1, wherein the fuel particles include Bi Structural Isotropic fuel (BISO) fuel particles.

4. A method of fabricating the nuclear fuel product of claim 1, comprising:
utilizing a non-stoichiometric reaction of ZrC, zirconium hydride (ZrH), and free carbon (C), wherein the ZrC is 0-10 mass percent and the free carbon is 0-4 mass percent.

5. A nuclear thermal propulsion system, comprising:
the nuclear fuel product of claim 1.

6. A nuclear reactor, comprising:
the nuclear fuel product of claim 1.

7. A method of fabricating the nuclear fuel product of claim 1, comprising:
creating a transient eutectic phase (TEP) silicon carbide (SiC) mixture that includes an SiC powder and an oxide power of at least one sintering aid to suppress a processing temperature for sintering of ZrC.

8. The method of fabricating the nuclear fuel product of claim 7, comprising:
prior to creating the TEP SiC mixture, implementing a chemical vapor deposition process to form the SiC powder as a 35 nanometer (nm) to 85 nm nanophase powder.

9. The method of fabricating the nuclear fuel product of claim 7, wherein the TEP SiC mixture includes approximately 94% SiC, 3.9% aluminum oxide ($Al_2O_3$), and 2.1% yttrium oxide ($Y_2O_3$) by mass.

10. The method of fabricating the nuclear fuel product of claim 7, further comprising:
mixing a ZrC powder with the TEP SiC mixture to form a ZrC-TEP SiC mixture.

11. The method of fabricating the nuclear fuel product of claim 10, wherein the mixing the ZrC powder with the TEP SiC mixture to form the ZrC-TEP SiC mixture includes:
adding the TEP SiC mixture to the ZrC powder; and
kinetic milling and high-shear milling to combine the ZrC powder with the TEP SiC mixture.

12. The method of fabricating the nuclear fuel product of claim 10, wherein the mixing the ZrC powder with the TEP SiC mixture is in a ratio of 10 wt % TEP SiC mixture.

13. The method of fabricating the nuclear fuel product of claim 10, further comprising:
adding the fuel particles to the ZrC-TEP SiC mixture;
loading the ZrC-TEP SiC mixture with the added fuel particles into a die; and
compacting the ZrC-TEP SiC mixture and the fuel particles by sintering.

14. The method of fabricating the nuclear fuel product of claim 13, wherein the sintering is at a processing pressure of less than or equal to 20 megapascals (MPa) and the suppressed processing temperature is less than or equal to 2,000 degrees Celsius.

15. The method of fabricating the nuclear fuel product of claim 13, wherein after the sintering:
the zirconium carbide matrix surrounds the fuel particles; and
the fuel particles are unbroken and are intimately bonded with the zirconium carbide matrix.

16. The method of fabricating the nuclear fuel product of claim 13, wherein the sintering includes spark plasma sintering.

17. A method of fabricating the nuclear fuel product of claim 1, comprising:
creating a non-stoichiometric mixture that includes a ZrC powder, a carbon (C) powder, and zirconium hydride (ZrH) to suppress a processing temperature for sintering of ZrC.

18. The method of fabricating the nuclear fuel product of claim 17, further comprising:
adding the fuel particles to the non-stoichiometric mixture; and
sintering the non-stoichiometric mixture and the fuel particles.

19. The method of fabricating the nuclear fuel product of claim 18, wherein the sintering the non-stoichiometric mixture and the fuel particles includes:
decomposing the hydride of the ZrH at approximately 900 degrees Celsius during the sintering to achieve a processing pressure of less than or equal to 20 megapascals (MPa) and the suppressed processing temperature between 1,650-1,800 degrees Celsius.

20. The method of fabricating the nuclear fuel product of claim 18, wherein the non-stoichiometric mixture includes the ZrH up to 10 weight percent by mass and the carbon between 0.1 to 4 weight percent by mass.

* * * * *